US005284175A

United States Patent [19]

Mykytyn

[11] Patent Number: 5,284,175

[45] Date of Patent: Feb. 8, 1994

[54] CAPPING APPARATUS AND METHOD

[76] Inventor: James Mykytyn, 840 Midway Rd., Powder Springs, Ga. 30073

[21] Appl. No.: 17,853

[22] Filed: Feb. 16, 1993

[51] Int. Cl.[5] .......... F16K 23/00

[52] U.S. Cl. .......... 137/15; 137/312; 220/256

[58] Field of Search .......... 137/312, 15; 220/233, 220/235, 256, 293, 295

[56] References Cited

U.S. PATENT DOCUMENTS

| | | | |
|---|---|---|---|
| 1,469,646 | 10/1923 | Rowland | 220/293 X |
| 1,700,503 | 1/1929 | Lyon et al. | 220/293 X |
| 3,323,541 | 6/1967 | Schneider et al. | 220/256 X |
| 3,344,944 | 10/1967 | Shutt et al. | 220/44 |
| 3,800,972 | 4/1974 | Raymond | 220/44 |
| 3,997,078 | 12/1976 | Melton et al. | 220/315 |
| 4,135,649 | 1/1979 | MacQuilkin et al. | 220/316 |
| 4,176,437 | 12/1979 | Scholz et al. | 29/402 |
| 4,580,694 | 4/1986 | Hempelmann et al. | 220/256 |
| 4,779,754 | 10/1988 | Ten Eyck et al. | 220/66 |
| 4,874,574 | 10/1989 | Wood et al. | 376/272 |

FOREIGN PATENT DOCUMENTS

| | | | |
|---|---|---|---|
| 338024 | 9/1934 | Fed. Rep. of Germany | 220/293 |
| 323508 | 7/1957 | Switzerland | 220/293 |
| 303428 | 12/1928 | United Kingdom | 220/293 |

OTHER PUBLICATIONS

"Chlorine Safe Handling," PPG, Pittsburgh, Pa., 1990.

"Chlorine Institute Emergency Kit 'B' for Chlorine Ton Containers," Edition 6, 1981, Instruction Booklet.

*Primary Examiner*—Stephen M. Hepperle
*Attorney, Agent, or Firm*—Hopkins & Thomas

[57] ABSTRACT

A capping apparatus (40) stops fluid from leaking from a tank valve (**14*a*, 14*b*) on a tank (11) containing, for example, chlorine. The capping apparatus (40) has a cylindrical outer housing (42) containing a cylindrical inner capping enclosure (58) which is selectively movable within the outer housing (42). The outer housing (42) is secured to the tank (11) via a flange (46) adapted to be secured to retaining straps (21*a*-21*d*) on the end wall (12) of the tank (11). The inner capping enclosure (58) has an opening (62) with a perimeter (63) capable of surrounding the leaking tank valve (14*a*, 14*b*) and engaging the end wall (12) of the tank (11) in a sealing relationship to thereby seal any leaking fluid within the inner capping enclosure (58). A sealing gasket (64) may be disposed at the perimeter (63) for promoting the sealing relationship. An adjustment means (68) having a threaded rod (72) is utilized for moving the inner capping enclosure (58) within the outer housing (42). Further, a rail configuration comprising rails (86*a*, 86*b*, 88) is used for providing guided linear movement of the inner capping enclosure (58) within the outer housing (42). Finally, a valve (92) is disposed on the inner capping enclosure (58) for providing selective release of fluid trapped within the inner capping enclosure (58**).

19 Claims, 3 Drawing Sheets

CAPPING APPARATUS AND METHOD

FIELD OF THE INVENTION

The present invention generally relates to emergency devices and, more particularly, to a capping apparatus and method for containing and stopping fluid from leaking from a valve of a tank.

BACKGROUND OF THE INVENTION

Chlorine ($Cl_2$) is a widely used chemical. It is used in laundry bleach, swimming pool chemicals, plastics (e.g., polyvinylchloride), insecticides, refrigerants, lubricant additives, chlorinated solvents, and many other products. Although a valuable and popular chemical, chlorine is a very hazardous toxic substance. Chlorine can burn eyes, sinuses, throat, and lungs, and prolonged exposure at high concentration can cause death.

While chlorine is a hazardous chemical, its hazards are well known, and reliable procedures and apparatuses have been developed over the years to handle and work with chlorine safely. Chlorine is usually sold by manufacturers in bulk quantities to various distributors who package and ship the chlorine, often in ton capacity tanks. The ton tanks are usually made of steel and are lifted by jib cranes or hoists.

A ton tank holds one ton of liquid chlorine. The chlorine does not completely fill the tank, as space must be allowed for expansion of the liquid, and a considerable volume of the tank contains chlorine gas above the liquid level The tank is about 30 inches in diameter and 81½ inches long. Its weight when empty is approximately 1,550 pounds. Generally, the ton container is equipped with two valves, an upper valve for discharging gaseous chlorine and a lower valve for discharging liquid chlorine.

A leak in a valve can be a serious hazard. Liquid chlorine evaporates extremely rapidly and expands to about 460 times its original volume. One pound of liquid chlorine will expand to 5 cubic feet of gas. Thus, even a very small leak is potentially dangerous. Furthermore, chlorine is a highly reactive chemical that reacts with most materials to form other chemical compounds, and these reactions can be violent. For example, chlorine will react with water (moisture in the air) to form hydrochloric and hypochlorous acids which are very corrosive. Further, in the presence of oils, greases, or other hydrocarbons, chlorine can cause ignition, produce toxic smoke, and form residues that can clog systems.

The valves of the tank are usually protected during transport and storage with a valve protection hood. The valve protection hood is a hemispherical structure having a surrounding flange at its opening, and the surrounding flange has flange openings. The flange openings are designed to receive retaining straps located on the tank. For installation of the valve protection hood, the protection hood is rotated after the flange openings receive the retaining straps on the tank, so that the hood is secured to the tank via the straps holding to the flange. The reverse procedure is used for removing the hood. Further, finger holes are usually provided on the hood for facilitating rotation of the hood.

When a leak occurs in a chlorine tank, a full-faced self-contained breathing apparatus, airline respirator, or the like must be worn by those persons attempting to repair the leak. A leaking chlorine ton tank is positioned so that the leak is in the uppermost part of the tank. This positioning allows the chlorine to escape as a gas rather than as a liquid, which makes a big difference in the amount of chlorine released to the atmosphere. A leak around the valve stem of the leaking valve can often be stopped by closing the valve or tightening the packing gland nut. For a leak at the valve discharge outlet, the leak can often be stopped by replacing the gasket in the adaptor connection. Moreover, pinhole leaks in the end wall of the tank can sometimes be stopped by driving a hardwood peg or metal drift pin into the leak hole. However, if a leak occurs at the threads near the base of a valve, the leak must be stopped by using an emergency capping kit. Several emergency capping kits are known in the industry and are commercially available. They are all similar to an extent.

For purposes of discussion, an example of such a conventional emergency capping apparatus is shown in FIG. 1. The emergency capping apparatus 9 of FIG. 1 is manufactured by Indian Springs, Inc., New York, U.S.A., and is known as the Ton Container Emergency Capping Kit B. The capping apparatus 9 is a very complex device and requires training for learning how to properly install it on a ton tank 11. The capping kit 9 essentially comprises a hood 23 for placing about a leaking tank valve 14*a*, as an example, an elongated C-shaped brace member 24 which is placed across the rim 13 of the tank 11 over the leaking tank valve 14*a* via jack screws 15*a*, 15*b* and adjusting screws 17*a*–17*d*, an adjustable cap screw 26*a* passing through a threaded aperture 27*a* in the brace member 24 to exert force against the hood 23, and a gasket 29 at the base of the hood 23 for helping to seal the leaking tank valve 14*a* within the hood 23.

Although adequate for stopping chlorine leaks, the prior art capping apparatuses, as exemplified by the capping apparatus 9 of FIG. 1, suffer from various problems and disadvantages. Most have many assembly pieces and are complex, as is very apparent by examination of FIG. 1. Most require more than one person to install as a result of the many pieces. Further, most can only cap one leaking valve, not two leaking valves. Specifically, referring to FIG. 1, two of the hoods 23 cannot be placed side by side to prevent leaking from both of tank valves 14*a*, 14*b* because the gaskets 29 would interfere with and obstruct each other. In addition, the capping apparatuses must be installed while wearing a gas-tight, Level-A, fully encapsulated suit which makes the task even much more difficult. Oftentimes, it can take a half an hour to install a prior art capping apparatus, such as that shown in FIG. 1.

Thus, a heretofore unaddressed need exists in the industry for a capping apparatus for stopping a chlorine leak in a valve of a tank which is simpler in design, which takes only a single person to install, which reduces the amount of time necessary for installation, and which is capable of sealing more than one leaking valve.

SUMMARY OF THE INVENTION

Accordingly, an object of the present invention is to overcome the problems and deficiencies of the prior art as described above.

Another object of the present invention is to provide a capping apparatus and method for stopping fluid from leaking from a leaking valve of a tank. Herein, the word "fluid" means liquid, gas, or a combination of both.

Another object of the present invention is to provide a capping apparatus and method for stopping chlorine from leaking from one or more valves of a chlorine tank.

Another object of the present invention is to provide a capping apparatus and method for stopping fluid from leaking from more than one leaking valve of a tank.

Another object of the present invention is to provide a capping apparatus and method for stopping fluid from leaking from a leaking valve of a tank utilizing only a single person.

Another object of the present invention is to provide a capping apparatus which is simple in design, inexpensive to manufacture, and efficient as well as reliable in operation.

Another object of the present invention is to provide a capping apparatus which can be installed in a very short time period.

Briefly described, the present invention is a capping apparatus and method for containing or stopping fluid from leaking from a valve of a tank. The tank may include a fluid, such as chlorine for example. The capping apparatus comprises an outer housing, a securing means for securing the outer housing about the leaking valve of the tank, and an inner capping enclosure. The inner capping enclosure is selectively movable within the outer housing and has an opening with a perimeter. The perimeter is capable of surrounding the leaking valve and engaging the tank in a sealing relationship to thereby trap any leaking fluid within the inner capping enclosure.

In addition to achieving all of the above recited objects of the invention, another advantage of the present invention is that it can be completely installed by a single person wearing a gas-tight, Level-A, fully encapsulated suit or a similar suit apparatus within minutes.

Another advantage of the present invention is that the capping apparatus can be easily removed, just as easily as it can be installed.

Another advantage of the present invention is that the capping apparatus comprises a single unit for easy storage and installation.

Another advantage of the present invention is that the capping apparatus is a very durable structure as a result of its unique construction.

Other objects, features, and advantages of the present invention will become apparent to one of skill in the art upon examination of the following drawings and the detailed description of this disclosure.

DETAILED DESCRIPTION OF THE PREFERRED EMBODIMENT

Figure 1:
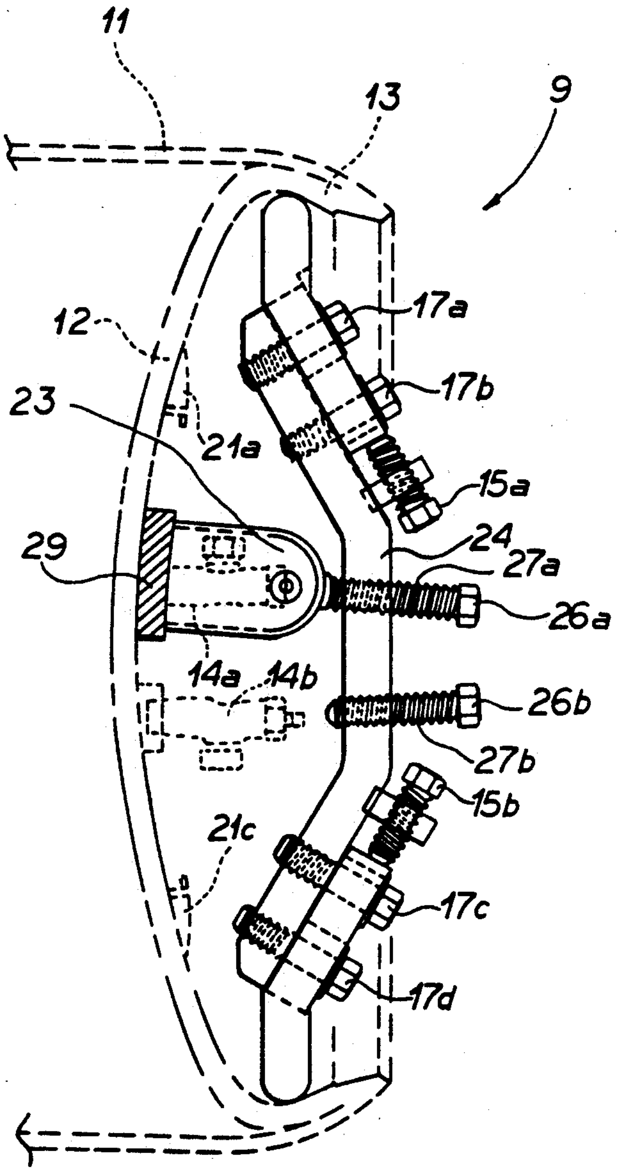
FIG 1 PRIOR ART
FIG. 1 is a side view showing a partial tank in cross-section and a prior art capping apparatus for sealing a leaking valve on the tank.
Figure 2:
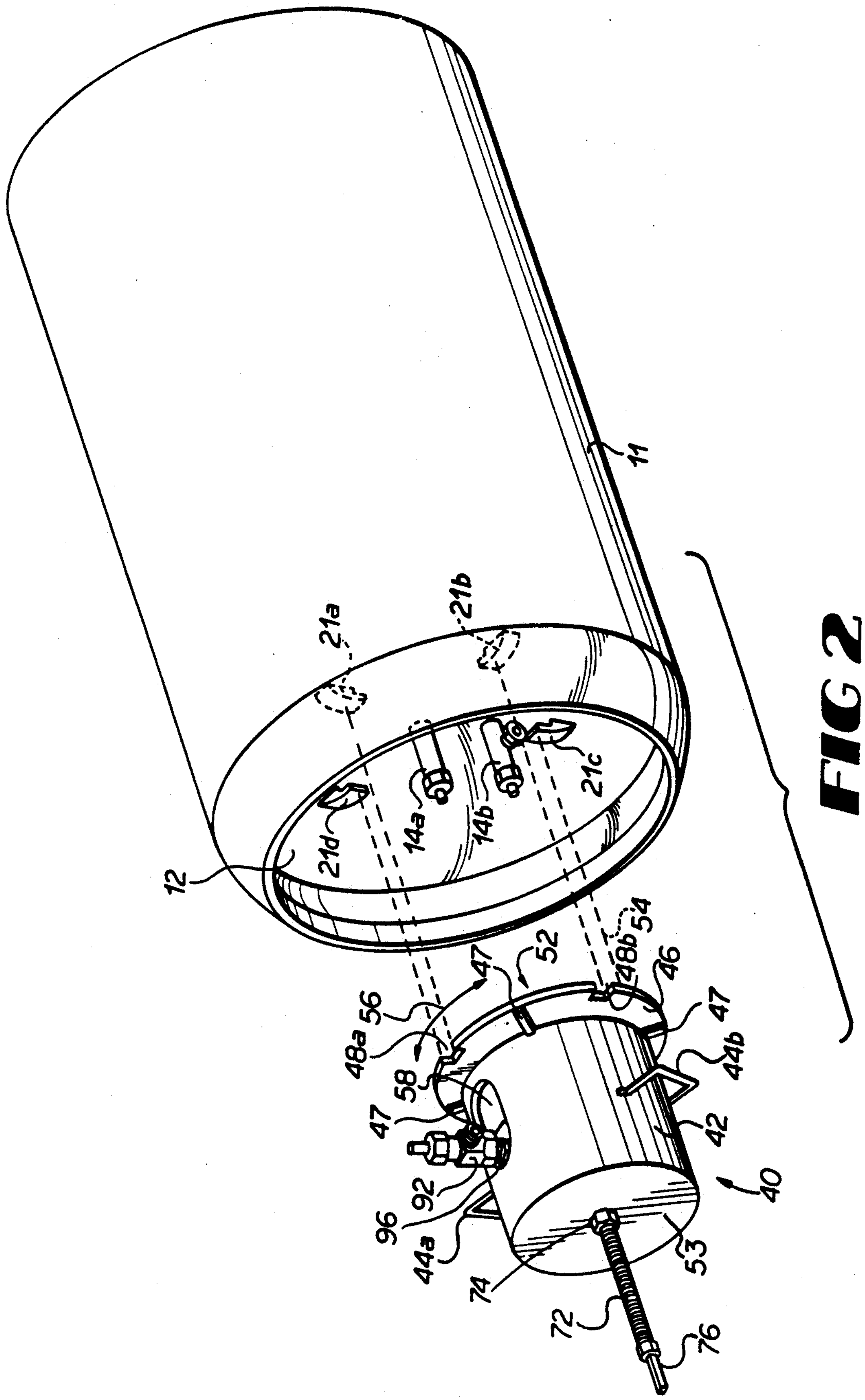
FIG. 2 is a perspective view showing the capping apparatus of the present invention and its installation on the tank of FIG. 1.

With reference now to the figures wherein like reference numerals designate corresponding parts throughout the several views, a capping apparatus 40 in accordance with the present invention is illustrated in FIG. 2. The capping apparatus 40 and associated methodology can be used for efficiently containing or stopping fluid leaking from the tank valves **14*a*, 14*b*, or both, on the tank 11. In structure, the capping apparatus 40 has a cylindrical outer housing 42 with an open end 52, closed end 53, and a pair 44 of handles 44*a*, 44*b* for the purpose of easy transport and installation. A securing means, such as a flange 46 having a plurality of flange openings 48*a*–48*d*, is disposed about the opening 52 of the capping apparatus 40 for the purpose of securing the outer housing 40 about the tank valves 14*a*, 14*b* of the tank 11. As indicated by phantom lines 54, the flange openings 48 are adapted to receive the retaining straps 21*a*–21*d* on the tank 11. The retaining straps 21*a*–21*d* are mounted, usually via a weld, at an outer end and have a distal inner end which is raised slightly from the end wall 12 of the tank 11. Further, after the flange openings 48 have received the retaining straps 21*a*–21*d*, the outer housing 42 is rotated, as indicated by reference arrow 56, so that the flange 46 is retained and gripped by the retaining straps 21*a*–21*d***.

A set of strap stops 47 may be disposed about the periphery of the flange 46. Preferably, one elongated rectangular strap stop 47 is positioned radially on the flange 46 to serve as a stop, or termination point, for a corresponding tank strap **21*a*–21*d* when the outer housing 42 is rotated for locking engagement with the tank 11**.

Figure 3:
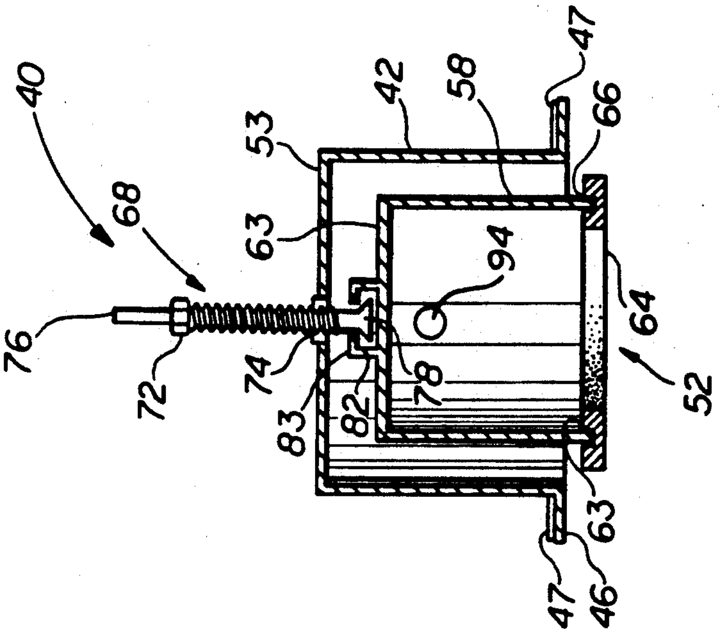
FIG. 3 is a cross-sectional view of the capping apparatus of FIG. 4.

As illustrated in FIG. 3, a cylindrical inner capping enclosure 58 is enclosed within the outer housing 42 and is movable longitudinally therein. The inner capping enclosure 58 has an open end 62, a closed end 63 opposing the open end 62, and a perimeter 63 around the opening 62 capable of surrounding the tank valves **14*a*, 14*b* and engaging the end wall 12 of tank 11 in a sealing relationship to thereby seal any leaking fluid within the inner capping enclosure 58**.

Figure 4:
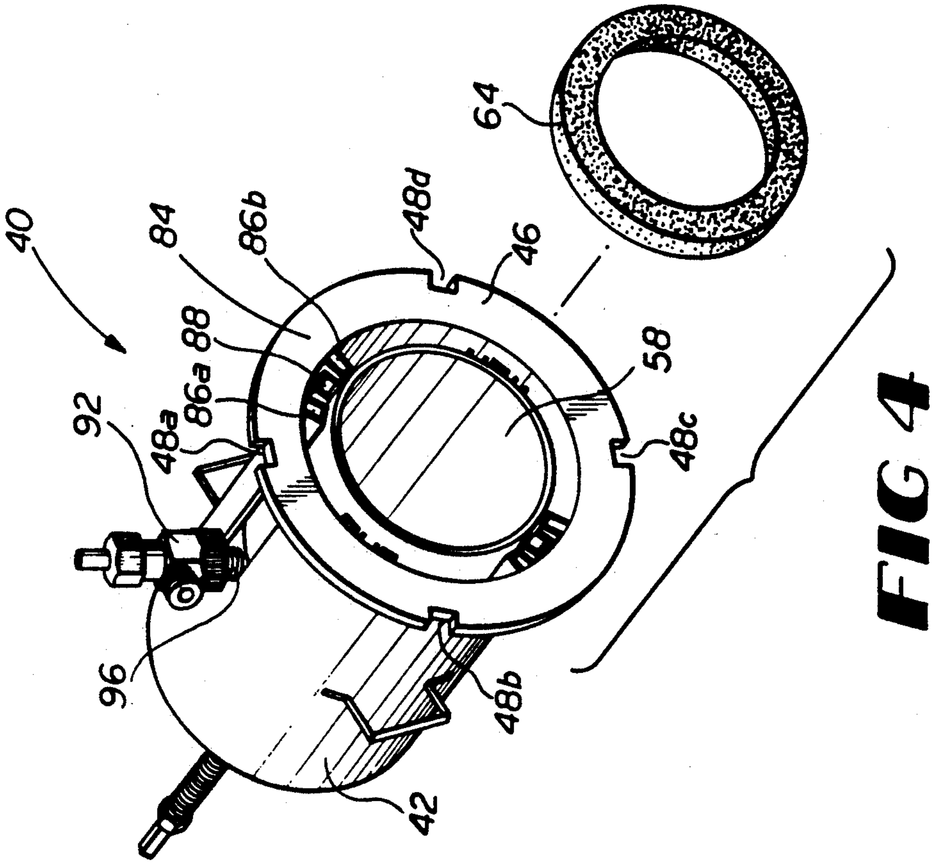
FIG. 4 is a bottom view of the capping apparatus of FIG. 1 and a top view of a gasket for placement on the inner capping enclosure of the capping apparatus of FIGS. 1, 2, and 3.

To aid in sealing the inner capping enclosure 58 against the end wall 12 of the tank 11, a circular sealing gasket 64 may be provided around the perimeter 63 of the inner capping enclosure 58. A cross section of the sealing gasket 64 is illustrated in FIG. 3 and a top view of the sealing gasket 64 is illustrated in FIG. 4. The sealing gasket 64 comprises a groove 66 around its circular span for receiving the perimeter 63 of the inner capping enclosure 58. The sealing gasket 64 may be formed from rubber, plastics, or any other suitable material. The material type may be dictated by the type of fluid contained within the tank 11. If the fluid within the tank 11 is chlorine, the sealing gasket may be manufactured with Viton®, which is manufactured by and commercially available from Dupont, Inc., U.S.A.

Referring again to FIG. 3, the capping apparatus 40 further comprises an adjustment means 68 for permitting selective movement of the inner capping enclosure 58 either away from or toward the end wall 12 of the tank 11. Preferably, the adjustment means 68 comprises an elongated threaded rod 72 passing through a threaded aperture 74 of the outer housing 42. The elongated threaded rod 72 has an outside end 76 with square cross-section disposed outside of the outer housing 42 for selective rotation and an inside end 78 with a contact plunger configuration which is engaged with the inner capping enclosure 58 and freely housed around its periphery within a cylindrical housing structure 82 having an upper retaining lip 83. The upper retaining lip 83 maintains engagement of the contact plunger 78 with the inner capping enclosure 58. Furthermore, when the elongated threaded rod 72 is rotated via the outside end 76, the rod 72 moves the inner capping enclosure 58 in a direction longitudinal, or axially, to the rod 72.

The capping apparatus 40 further comprises a guide means 84 for providing guided linear movement of the inner capping enclosure 58 to and from the end wall 12 of the tank 11 within the outer housing 42. The guide means 84 is illustrated in FIG. 4. Preferably, the guide means 84 comprises a plurality of opposing rail configurations spaced symmetrically about the periphery of the inner capping enclosure 58. Each rail configuration comprises a pair of parallel rails 86*a*, 86*b* connected to the interior of the outer housing 42 and a rail 88 slidable between the rails 86*a*, 86*b* and connected to the exterior of the inner capping enclosure 58. The rails 86*a*, 86*b*, 88 may be solid or tubular structures and preferably stop a small distance short of the perimeter 63 so that the sealing gasket 64 may be easily and firmly secured on the perimeter 63.

A capping enclosure valve 92, as shown in FIGS. 2 and 4, may be disposed on the inner capping enclosure 58 for the purpose of permitting release of trapped fluid from the inner capping enclosure 58 through orifice 94 and pipe section 96. The pipe section 96 protrudes outwardly through an elliptical throughway aperture 98 within the lateral wall of the cylindrical outer housing 42. The elliptical throughway aperture 98 permits unimpeded movement of the pipe section 96 and valve 92 as the inner capping enclosure 58 is moved within the outer housing 42.

It will be obvious to those skilled in the art that many variations and modifications may be made to the preferred embodiment described above without substantially departing from the spirit and scope of the present invention. For example, any tank containing any type of fluid, such as a gas or liquid or something other than chlorine, can be contained by the capping apparatus 40 of the present invention. As another example, the tank need not necessarily be a one ton capacity tank so long as the tank has retaining straps 21*a*–21*d* or other securing means for securing the capping apparatus 40 to the tank 11. Accordingly, all such variations and modifications are intended to be included herein and within the scope of the present invention as set forth in the following claims.

Wherefore, the inventor claims the following:

1. A capping apparatus for containing fluid leaking from a valve connected to a tank, comprising:
- an outer housing;
- securing means for securing said outer housing about said valve of said tank; and
- an inner capping enclosure selectively movable within said outer housing and having an opening with a perimeter capable of surrounding said valve and engaging said tank in a sealing relationship to thereby seal said fluid within said inner capping enclosure.

2. The apparatus of claim wherein said outer housing comprises a cylinder structure having a closed end and an open end and wherein said securing means comprises a flange surrounding said open end having flange openings, said flange openings for receiving protruding retaining straps on said tank, said flange adapted to be rotated after said flange openings have received said retaining straps so that said flange is secured to said retaining straps.

3. The apparatus of claim 1, wherein said tank is a one ton chlorine tank.

4. The apparatus of claim 1, further comprising a sealing means placed around said perimeter for promoting said sealing relationship.

5. The apparatus of claim 1, further comprising an adjustment means for permitting selective movement of said inner capping enclosure from a position outside of said outer housing.

6. The apparatus of claim 1, further comprising a valve means for permitting selective release of fluid enclosed within said inner capping enclosure.

7. The apparatus of claim 2, wherein said inner capping enclosure comprises a second cylinder structure having a second closed end and a second open end, said second open end having said perimeter.

8. The apparatus of claim 5, wherein said adjustment means comprises an elongated threaded rod passing through a threaded aperture in said outer housing, said threaded rod having an outside end disposed outside of said outer housing for selective rotation and an inside end engaged with said inner capping enclosure so that when said rod is rotated, said rod moves said inner capping enclosure in a direction longitudinal to said rod.

9. The apparatus of claim 7, further comprising an adjustment means for permitting selective movement of said inner capping enclosure within said outer housing, said adjustment means comprising an elongated threaded rod passing through a threaded aperture in said outer housing, said threaded rod having an outside end disposed outside of said outer housing for selective rotation and an inside end engaged with said inner capping enclosure so that when said rod is rotated, said rod moves said inner capping enclosure in a direction longitudinal to said rod.

10. The apparatus of claim 7, further comprising a guide means for providing guided linear movement of said inner capping enclosure within said outer housing.

11. An apparatus for stopping fluid from leaking from a leaking valve of a tank having retaining straps for a valve protection hood, comprising:
- an enclosure having an opening for receiving said valve, said opening capable of engaging said tank and sealing said leaking valve within said closure;
- mounting means for mounting said enclosure to said tank via said retaining straps on said tank, said mounting means comprising an outer housing movable about said enclosure; and
- adjustment means for permitting selective movement of said enclosure so that said enclosure can selectively seal said leaking valve, said adjustment means comprising a threaded rod passing through a threaded aperture in said outer housing, said rod moving axially upon rotation, said threaded rod having an outside end disposed outside of said outer housing for selective rotation and an inside end engaged with and for moving said enclosure.

12. The apparatus of claim 11, wherein said outer housing has a lip with lip openings, said lip openings for receiving retaining straps and said lip for securing said outer housing to said retaining straps upon rotation of said outer housing.

13. The apparatus of claim 11, wherein said tank is a one ton chlorine tank.

14. The apparatus of claim 11, further comprising a seal placed around said opening.

15. The apparatus of claim 11, further comprising a valve for permitting release of fluid from said enclosure.

16. The apparatus of claim 11, further comprising a guide means for providing guided linear movement of said enclosure within said outer housing.

17. A method for producing a capping apparatus for stopping fluid from leaking from a leaking valve of a tank, comprising the steps of:

disposing an inner capping enclosure within an outer housing with said inner capping enclosure being selectively movable within said outer housing and having an opening with a perimeter for surrounding said leaking valve;

forming a lip on said outer housing with lip openings, said opening for receiving restraining straps on said tank and said lip for securing said outer housing to said retaining straps upon rotation of said outer housing; and providing an adjustment means for moving said inner capping enclosure within said outer housing and for moving said perimeter about said valve and against said tank.

18. The method of claim 17,. further comprising the steps of:

forming said outer housing with a first cylinder structure having a first closed end and a first open end and wherein said lip surrounds said open end;

forming said inner capping enclosure with a second cylinder structure having a second closed end and a second open end, said second open end having said perimeter; and forming said adjustment means with a selectively rotatable threaded rod passing through a threaded aperture in said first closed end of said outer housing and engaging said second closed end of said second cylinder structure, said rod moving axially upon rotation for moving said second cylinder structure.

19. The method of claim 18, further comprising the step of disposing a valve on said inner capping enclosure for permitting release of fluid from said inner capping enclosure.

* * * * *